(12) United States Patent
Baik

(10) Patent No.: US 7,931,329 B2
(45) Date of Patent: Apr. 26, 2011

(54) BUFFERING STRUCTURE FOR CARGO BOX GATE OF TRUCK

(75) Inventor: In Chul Baik, Jeonbuk (KR)

(73) Assignee: Hyundai Motor Company, Seoul (KR)

( * ) Notice: Subject to any disclaimer, the term of this patent is extended or adjusted under 35 U.S.C. 154(b) by 175 days.

(21) Appl. No.: 12/275,123

(22) Filed: Nov. 20, 2008

(65) Prior Publication Data

US 2009/0261611 A1   Oct. 22, 2009

(30) Foreign Application Priority Data

Apr. 17, 2008  (KR) .................. 10-2008-0035663

(51) Int. Cl.
*B62D 33/027* (2006.01)
(52) U.S. Cl. ...................... 296/186.4; 296/14
(58) Field of Classification Search ............. 296/10, 296/14, 181.3, 181.4, 182.1, 183.1, 186.1, 296/186.4, 43, 42, 50, 51
See application file for complete search history.

(56) References Cited

U.S. PATENT DOCUMENTS

| | | | | | |
|---|---|---|---|---|---|
| 809,388 | A | * | 1/1906 | Mills | 296/14 |
| 1,704,574 | A | * | 3/1929 | Nelson | 296/14 |
| 1,891,301 | A | * | 12/1932 | Bordeaux | 296/10 |
| 1,893,532 | A | * | 1/1933 | Ball | 296/10 |
| 2,297,298 | A | * | 9/1942 | Freeman | 296/14 |
| 3,365,230 | A | * | 1/1968 | Langdon | 296/3 |
| 3,574,391 | A | * | 4/1971 | Doboze | 296/36 |
| 3,784,243 | A | * | 1/1974 | Pastva, Jr. | 292/300 |
| 3,975,046 | A | * | 8/1976 | Dutil | 296/186.5 |
| 4,024,671 | A | * | 5/1977 | Isobe | 49/104 |
| 4,613,182 | A | * | 9/1986 | Stone | 296/186.4 |
| 5,170,746 | A | * | 12/1992 | Roose | 119/512 |
| 5,297,840 | A | * | 3/1994 | Size et al. | 296/50 |
| 6,152,511 | A | * | 11/2000 | Gustafson | 296/32 |
| 6,325,438 | B1 | * | 12/2001 | Anderson | 296/36 |
| 6,536,824 | B2 | * | 3/2003 | Anderson | 296/36 |
| 6,742,826 | B2 | * | 6/2004 | Humphrey et al. | 296/51 |
| 6,779,825 | B1 | * | 8/2004 | Greenert et al. | 296/51 |
| 7,338,106 | B2 | * | 3/2008 | Poudrier | 296/50 |
| 7,575,264 | B1 | * | 8/2009 | Solomon | 296/26.02 |
| 2009/0261611 | A1 | * | 10/2009 | Baik | 296/43 |

FOREIGN PATENT DOCUMENTS

| | | | |
|---|---|---|---|
| DE | 19607755 A1 | * | 9/1996 |
| JP | 06298126 A | * | 10/1994 |
| JP | 8-26146 A | | 1/1996 |
| JP | 2003-072597 | | 3/2003 |
| JP | 2005240325 A | * | 9/2005 |
| JP | 2008195131 A | * | 8/2008 |
| KR | 1999-0022993 U | | 7/1999 |

* cited by examiner

*Primary Examiner* — Joseph D Pape
(74) *Attorney, Agent, or Firm* — Morgan, Lewis & Bockius LLP

(57) ABSTRACT

A buffering structure for the side gates of a cargo box of a truck is disclosed. The buffering structure includes front and rear side gates pivotally mounted on each side of the cargo box, and a middle column interposed between the front side gate and the rear side gate. Buffer members are interposed between the middle column and the front and rear side gates to resiliently support the front and rear side gates. Since the buffer member for resiliently supporting the front and rear side gates is installed on the middle column of the cargo box, deformation of the side gates is prevented and thus the lifespan of the cargo box is extended. Also, the generation of vibration and noise by friction comfort is reduced to improve driving comfort, as well as the smooth opening and closing of the side gates.

12 Claims, 5 Drawing Sheets

BUFFERING STRUCTURE FOR CARGO BOX GATE OF TRUCK

CROSS-REFERENCE TO RELATED APPLICATION

This application is based on and claims priority from Korean Patent Application No. 10-2008-0035663, filed on Apr. 17, 2008, in the Korean Intellectual Property Office, the disclosure of which is incorporated herein in its entirety by reference.

BACKGROUND OF THE INVENTION

1. Field of the Invention

The present invention relates to a buffering structure for a cargo box gate of a truck, and more particularly, to a buffering structure for the side gates of a cargo box of a truck, which can prevent deformation of the side gates and lead to stable operation by installing a buffer member for absorbing deformation of the side gates in the cargo box.

2. Description of the Prior Art

In general, a heavy truck is a vehicle for carrying or transporting goods or cargo. Such a heavy truck includes a cargo box of a size two times as much as a general truck, the cargo box having a side gate separated into two parts so as to stably and conveniently support the goods.

FIGS. 1 and 2 show a cargo box of a conventional heavy truck.

The cargo box of the heavy truck includes, as shown in FIG. 1, a front side gate 10, a rear side gate 20, and a middle column 30 interposed between the front side gate 10 and the rear side gate 20 for supporting the side gates 10 and 20.

The middle column 30 is configured to be perpendicularly inserted in a column holder (not shown) which is integrally formed on a bottom portion of the cargo box. The column holder has a size sufficient to easily put in or out of the column holder.

Coupling members 40 are respectively installed between the front side gate 10 and the middle column 30 and between the rear side gate 20 and the middle column 30 so as to couple the front and rear side gates 10 and 20 thereon.

Each of the coupling members 40 includes a coupling hook 41 mounted on the middle column 30, a coupling portion 42 provided on each of the front and rear side gates 10 and 20 and supported by the coupling hook 41, and a fixing lever 43 engaged to the coupling hook 41 to prevent the coupling portion form becoming unlocked. The respective front and rear side gates 10 and 20 are configured to be spaced with a predetermined distance from the middle column 30 as shown in FIG. 2.

However, when the heavy truck carrying on the goods drives on a road, the center portion of the cargo box falls down due to the load of the goods. As a result, the upper ends of the front and rear side gates come in close contact with the middle column 30 to lead to the deformation of the side gates 10 and 20, which shortens the lifespan of the cargo box.

In addition, friction between the middle column 30 and the front and rear side gates 10 and 20 due to their contact respectively, generates vibration and noise, and hinders the smooth opening and closing of the front and rear side gates 10 and 20.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Accordingly, embodiments of the present invention has been made to solve the above-mentioned problems occurring in the prior art while the advantages achieved by the prior art are maintained.

One object of the present invention is to provide a buffering structure for the side gates of a cargo box of a heavy truck, in which a buffer member is installed on the middle column of the cargo box to resiliently support front and rear side gates, thereby preventing deformation of the side gates, as well as reducing vibration and noise of the side gates and assisting the smooth opening and closing of the side gates.

In order to accomplish the object, a buffering structure is provided for the side gates of a cargo box of a truck, according to the present invention, which may include front and rear side gates pivotally mounted on each side of the cargo box; and the middle column interposed between the front side gate and the rear side gate with a buffer space between the middle column and the front and rear side gates; wherein buffer members are interposed between the middle column and the front and rear side gates to resiliently support the front and rear side gates.

The buffer member may include at least a support panel, provided on each side of the middle column, to support the front and rear side gates respectively, a hinge pin pivotally fixing the support panel to the middle column, and a resilient member provided between the middle column and the support panel.

The buffering structure further may include a locking member, provided on a contact surface between the support panel and the middle column, and regulating a rotation angle of the support panel with respect to the hinge pin, wherein the locking member may include a longitudinal groove having a predetermined length and formed on the middle column, and a stepped portion formed on one side of the support panel, the stepped portion engaged into and supported by the longitudinal groove.

Preferably, the resilient member comprises a leaf spring.

The buffer member further may include a coupling member to couple the front and rear side gates to the middle column, wherein the coupling member may include a coupling hook mounted on the buffer member, a coupling plate provided on each of the front and rear side gates and having a groove for receiving the coupling hook, and a fixing lever, elastically engaged to the coupling hook, to prevent the coupling plate from becoming unlocked.

With the above construction, since the buffer member for resiliently supporting the front and rear side gates is installed on the middle column of the cargo box, deformation of the side gates is prevented, and the lifespan of the cargo box is extended. Also, the generation of vibration and noise by friction is reduced to improve driving comfort, as well as the smooth opening and closing of the side gates.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENTS

Figure 1:
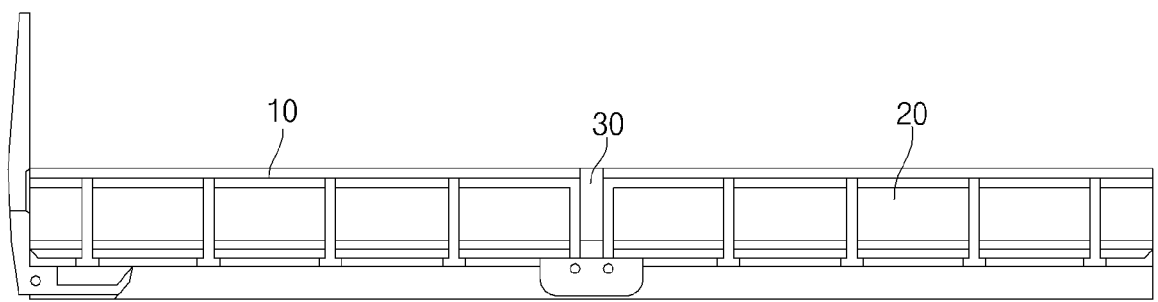
FIG. 1 is a side view illustrating a conventional cargo box of a heavy truck.
Figure 2:
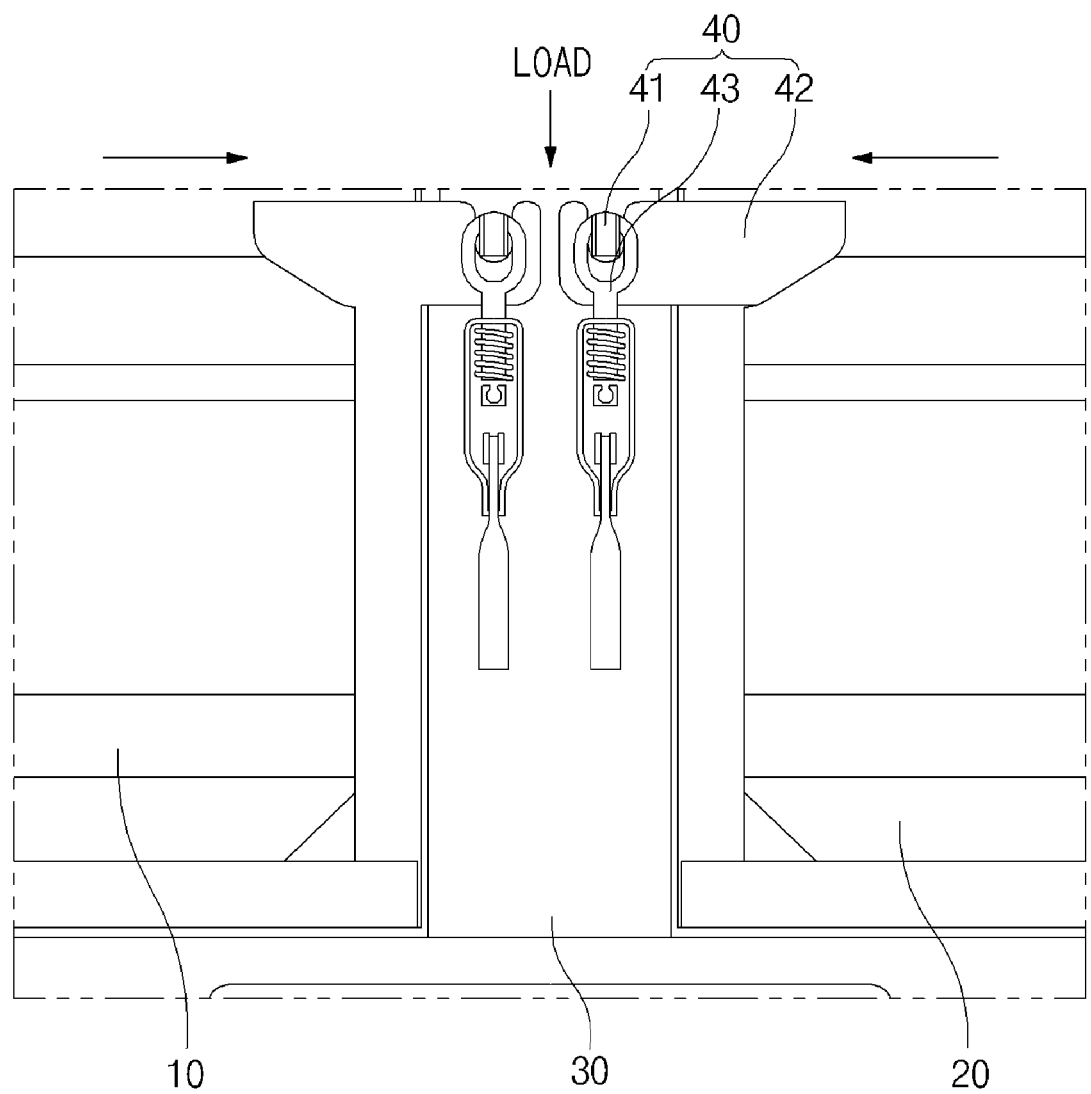
FIG. 2 is a partially enlarged side view of coupling member of FIG. 1.

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

A buffering structure for the side gates of a cargo box of a truck according to an exemplary embodiment of the present invention will now be described in detail with reference to FIGS. 3 to 5.

In the entire description of the present invention, the same drawing reference numerals are used for the same elements across various figures, and the detailed description thereof will be omitted.

Figure 3:
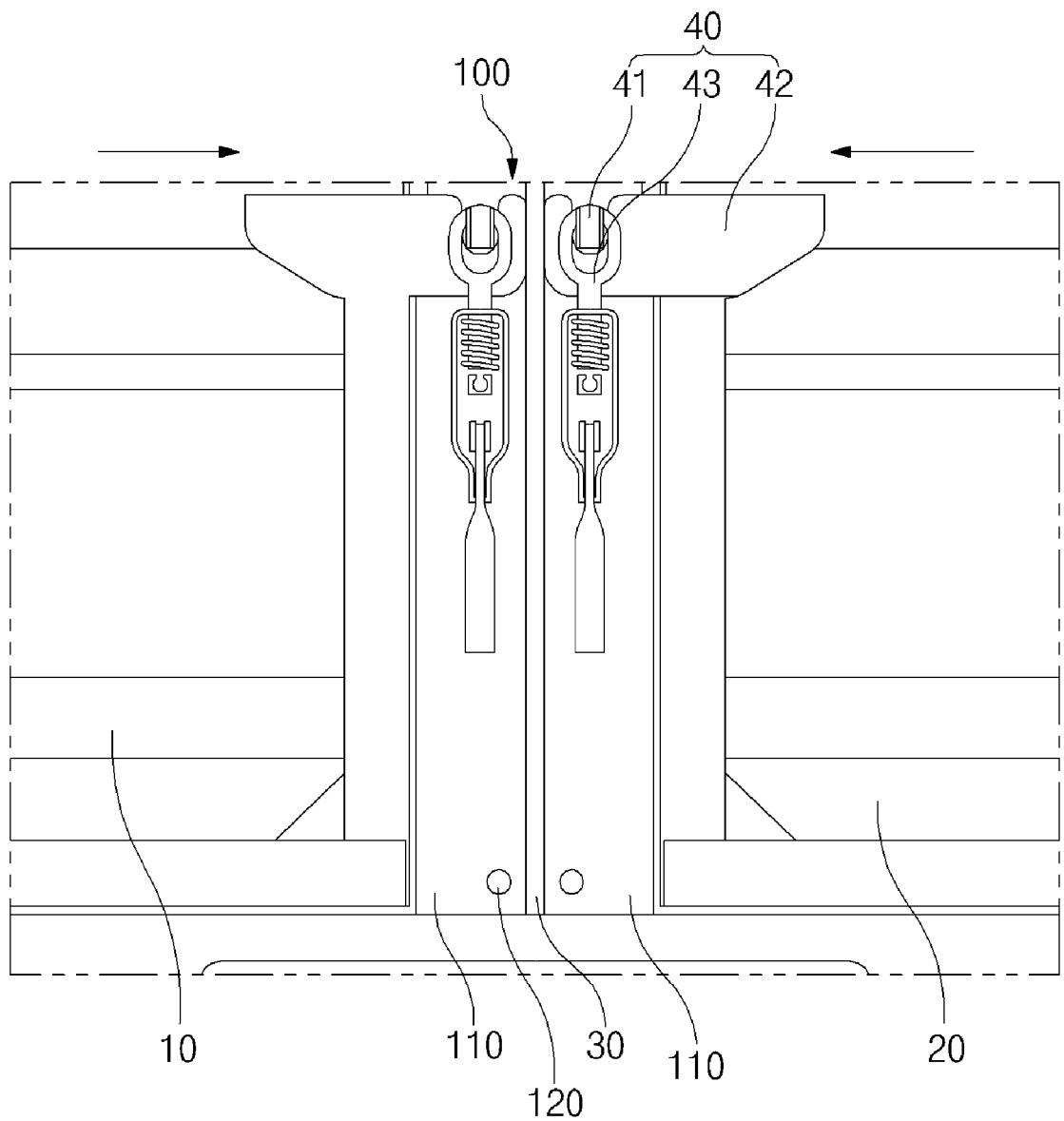
FIG. 3 is a cargo box installed with a buffering structure for side gates according to an exemplary embodiment of the present invention.
Figure 4:
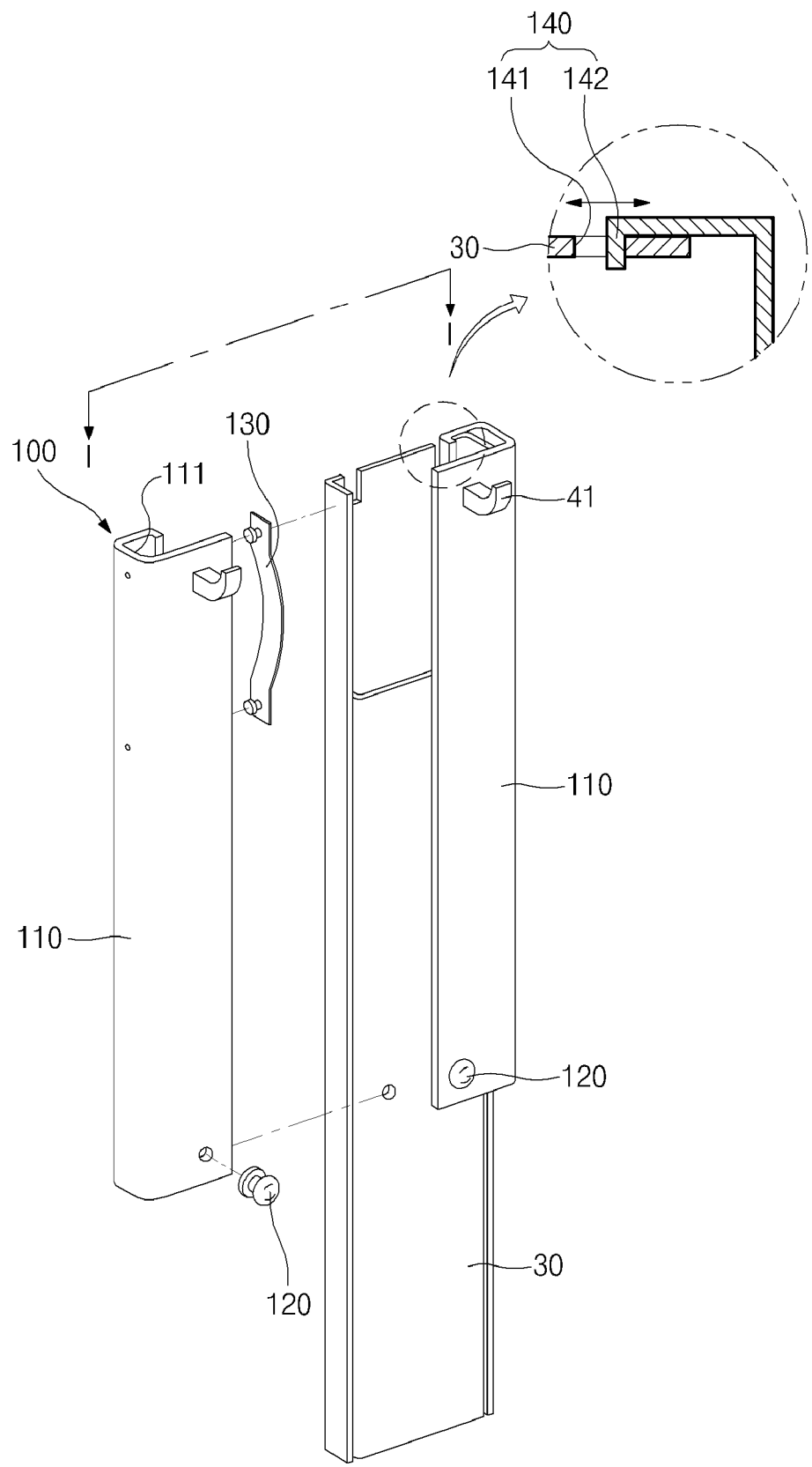
FIG. 4 is a perspective view illustrating a buffering structure for the side gates of a cargo box of a truck according to an exemplary embodiment of the present invention.

The cargo box of the truck according to an exemplary embodiment of the present invention includes, as shown in FIGS. 3-4, the front side gates 10 and rear side gates 20 pivotally mounted on each side of the cargo box, and the middle column 30 interposed between the front side gate 10 and the rear side gate 20 and fixed to the cargo box at a lower portion thereof to support the front and rear side gates 10 and 20 perpendicularly.

A buffer member 100 is for preventing between the middle column 30 and the front and rear side gates 10 and 20 to prevent deformation of the front and rear side gates 10 and 20.

The buffer member 100 is to prevent deformation of the front and rear side gates 10 and 20 when the cargo box carries goods, and includes support panels 110 to support the front and rear side gates 10 and 20 respectively, hinge pins 120 pivotally fixing the support panels 110 to lower portion of the middle column 30, and resilient members 130 fixed at upper portions of the support panels 110 to apply a restoring force to support panels 110 respectively.

The support panels 110 are for supporting the front and rear side gates 10 and 20, and are respectively interposed between the middle column 30 and the front and rear side gates 10 and 20. The support panel 110 is provided at one side thereof with the channel 111 movably inserted on to the side of the middle portion 30. The other side of the support panel 110 supports the sides of the front or rear side gate 10 or 20.

The hinge pin 120 penetrates a lower portion of the front side (a front side when viewing in FIG. 4) of the support panel 110, and then is coupled to the middle column 30. The upper portion of the support panel 110 pivotally rotates around the hinge pin 120 in a left or right direction in the drawing.

Figure 5A:
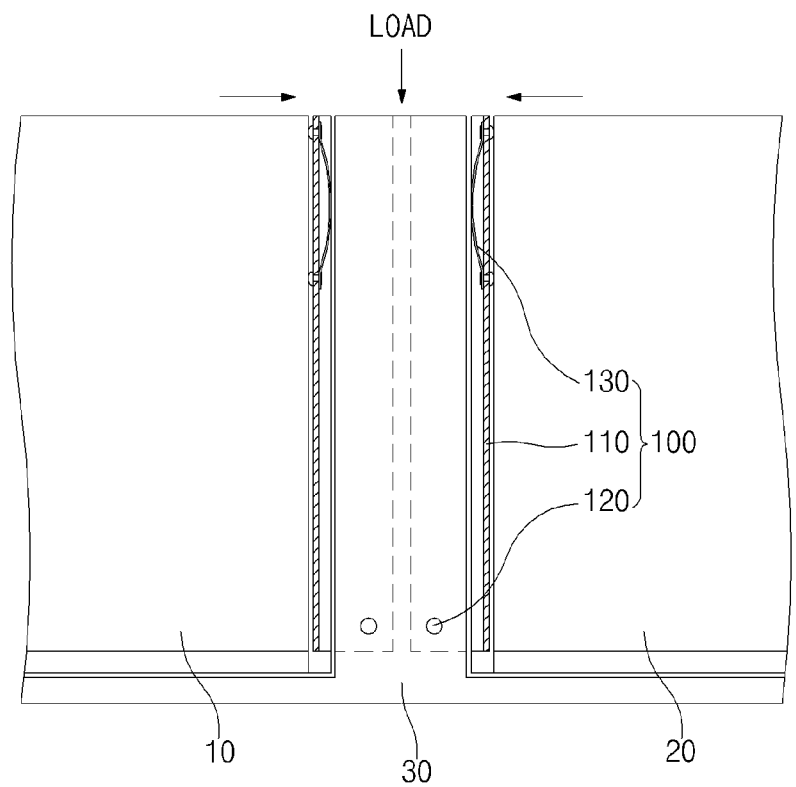
FIGS. 5A and 5B are cross-sectional view along I-I of FIG. 4 for cargo box installed with a buffering structure of the side gates thereof, wherein a load is applied to the cargo box.

The resilient member 130 is a ")-shaped/" leaf spring, and is interposed between the middle column 30 and the respective support panels 110 as shown in FIG. 5. In an exemplary embodiment of the present invention, the resilient members 130 are positioned in the channel 111 of the support panel 110 respectively and both ends of the resilient member 130 are fixed to the inner surface of the channel 111 at the support panel 110 by a bolt or rivet to resiliently support the support panel 110 against the middle column 30 (See FIG. 5A). In another exemplary embodiment of the present invention, both ends of the resilient member 130 may be fixed to the both sides of the middle column 30 to support the middle column 30 against the support panel 110.

More specifically, the resilient member 130 secures a buffer space between the middle column 30 and the respective support panel 110 to apply a restoring force to the support panel 110 or the middle column 30. As a result, if the upper ends of the front and rear side gates 10 and 20 are forced toward the middle column 30, the buffer space absorbs the external force to prevent deformation of the front and rear side gates 10 and 20 (See FIG. 5B).

The resilient member 130 is not limited to the leaf spring, and any material having a buffer force and a restoring force may be employed, for example, a coil spring, sponge or rubber.

In addition, a locking member 140 is provided on a contact surface between the support panel 110 and the middle column 30 to regulate a rotation angle of the support panel 110 with respect to the hinge pin 120.

The locking member 140 prevents the support panel 110 from being released from the middle column 30, and includes a longitudinal groove 141 formed on the rear surface of the middle column 30 in a horizontal direction, and a stepped portion 142 formed on the upper end of the channel 111 of the support panel 110 sufficiently corresponding to the longitudinal groove 141 and engaged into and supported by the longitudinal groove 141.

More specifically, with the locking member 140, if the support panel 110 rotates in a horizontal direction with respect to the hinge pin 120, the stepped portion 142 of the channel 111 is supported by both inner surfaces of the longitudinal groove 141, which controls the rotation angle of the support panel 110. As a result, it can prevent the support panel 110 from being released, and thus lead to stable pivot movement (See the enlarged portion in FIG. 4).

The buffer member 100 also includes a coupling member 40 for firmly coupling the front and rear side gates 10 and 20 to the middle column 30.

More specifically, the coupling member 40 includes, as shown in FIG. 3, a coupling hook 41 mounted on the support panel 110, a coupling plate 42 provided respectively on each of the front and rear side gates 10 and 20 and extending substantially over the support panel 110, having a groove for receiving the coupling hook 41 therethrough and supported by the middle column 30, and a fixing lever 43 provided on the support panel 110 which is elastically engaged to the coupling hook 41 to prevent the coupling plate 42 from becoming unlocked from the support panel 110.

The coupling member 40 has the same construction and function as those of the coupling member 40 described in the prior art, and thus the detailed description will be omitted herein.

The operation of the buffering structure for the cargo box of a truck according to an exemplary embodiment of the present invention will now be described, referring to FIG. 5.

First, the goods are loaded on the cargo box of the truck, and the front and rear side gates 10 and 20 are firmly coupled to the middle column 30 by means of the coupling member 40 as illustrated in FIG. 5A.

Figure 5B:
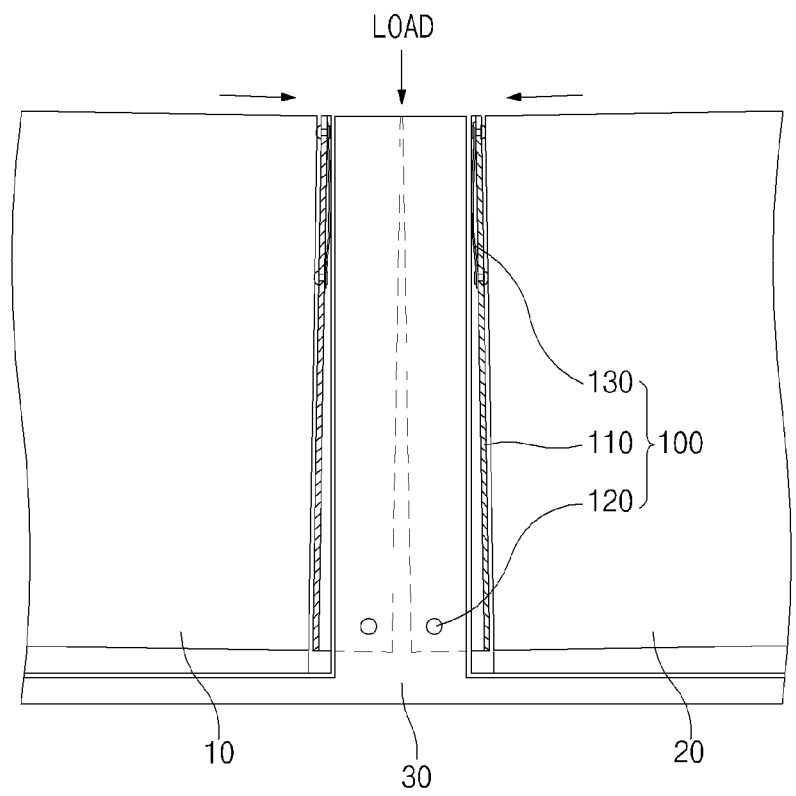

When the truck drives on an unpaved road or in high speed, the cargo box is perpendicularly moved due to the load of the goods. In this instance, since the goods are generally positioned at a center portion of the cargo box, the center portion of the cargo box is remarkably deformed by the load of the goods as illustrated in FIG. 5B.

If the cargo box is deformed, the upper ends of the front and rear side gates 10 and 20 are inclined towards the middle column 30. In this instance, the buffer member 100 absorbs the deformation of the front and rear side gates 10 and 20.

More specifically, when the front and rear side gates 10 and 20 are inclined toward the middle column 30 with respect to the hinge pins 120, the upper ends of the front and rear side gates 10 and 20 push the support panels 110 of the buffer member 100 towards each other as the arrows in the drawing shows. The pushed support panel 110 rotates around the hinge pins 120 toward the middle column 30 and contacts each other, and then the rotation of the support panel 110 is buffered by the resilient member 130 in the buffer space. As a result, the deformation of the front and rear side gates 10 and 20 is absorbed to prevent deformation thereof.

Although the preferred embodiments of the present invention have been described for illustrative purposes, those skilled in the art will appreciate the various modifications and the possibility of additions and substitutions, without departure from the scope and spirit of the invention as disclosed in the accompanying claims.

What is claimed is:

1. A buffering structure for the side gates of a cargo box of a truck, comprising:
    front and rear side gates pivotally mounted on each side of the cargo box; and
    a middle column interposed between the front side gate and the rear side gate with a buffer space between the middle column and the front and rear side gates;
    wherein buffer members are interposed between the middle column and the front and rear side gates and resiliently supports the front and rear side gates;
    wherein the buffer member comprises:
        at least a support panel, provided on each side of the middle column and supporting the front and rear side gates respectively;
        a hinge pin pivotally fixing the support panel to the middle column; and
        a resilient member provided between the middle column and the support panel and elastically supporting the middle column and the support panel.

2. The buffering structure as claimed in claim 1, further comprising a locking member, provided on a contact surface between the support panel and the middle column and regulating a rotation angle of the support panel with respect to the hinge pin, wherein the locking member comprises:
    a longitudinal groove having a predetermined length and formed on the middle column; and
    a stepped portion formed on one side of the support panel, the stepped portion engaged into and supported by the longitudinal groove.

3. The buffering structure as claimed in claim 1, wherein the resilient member comprises a leaf spring.

4. The buffering structure as claimed in claim 3, wherein the resilient member is shaped of ")".

5. The buffering structure as claimed in claim 1, wherein the resilient member is selected from the group consisting of coil spring, sponge and rubber.

6. The buffering structure as claimed in claim 1, wherein the buffer member further comprises a coupling member for coupling the front and rear side gates to the middle column; and the coupling member includes:
    a coupling hook mounted on the buffer member;
    a coupling plate provided on each of the front and rear side gates, and having a groove for receiving the coupling hook; and
    a fixing lever, elastically engaged to the coupling hook, to prevent the coupling plate from becoming unlocked from the buffer member.

7. The buffering structure as claimed in claim 1, wherein the buffer member further comprises a coupling member for fixing the front and rear side gates to the middle column; and the coupling member includes:
    a coupling hook mounted on the support panel;
    a coupling plate provided on each of the front and rear side gates and extending over the support panel, and having a groove for receiving the coupling hook; and
    a fixing lever, elastically engaged to the coupling hook, for preventing the coupling plate being unlocked from the support panel.

8. The buffering structure as claimed in claim 2, wherein the buffer member further comprises a coupling member for fixing the front and rear side gates to the middle column; and the coupling member includes:
    a coupling hook mounted on the support panel;
    a coupling plate provided on each of the front and rear side gates and extending over the support panel, and having a groove for receiving the coupling hook; and
    a fixing lever, elastically engaged to the coupling hook, to prevent the coupling plate from becoming unlocked.

9. The buffering structure as claimed in claim 3, wherein the buffer member further comprises a coupling member for fixing the front and rear side gates to the middle column; and the coupling member includes:
    a coupling hook mounted on the support panel;
    a coupling plate provided on each of the front and rear side gates and extending over the support panel, and having a groove for receiving the coupling hook; and
    a fixing lever, elastically engaged to the coupling hook, to prevent the coupling plate from becoming unlocked.

10. The buffering structure as claimed in claim 1, wherein the buffer member comprises:
    at least a support panel, provided on each side of the middle column and supporting the front and rear side gates respectively, wherein a channel is provided at one side thereof and movably inserted on to a side of the middle column and the other side of the support panel supports the front or rear side gate;
    a hinge pin pivotally fixing a lower portion of the support panel to the middle column; and
    a resilient member provided between the middle column and the support panel.

11. The buffering structure as claimed in claim 10, further comprising a locking member, provided on a contact surface between the support panel and the middle column and regulating a rotation angle of the support panel with respect to the hinge pin, wherein the locking member comprises:
    a longitudinal groove having a predetermined length and formed on upper portion of the middle column; and
    a stepped portion formed on upper portion of the channel, the stepped portion engaged into and supported by the longitudinal groove.

12. The buffering structure as claimed in claim 11, wherein the buffer member further comprises a coupling member for fixing the front and rear side gates to the middle column; and the coupling member includes:

a coupling hook mounted on the support panel;

a coupling plate provided on each of the front and rear side gates and extending over the support panel, and having a groove for receiving the coupling hook; and a fixing lever, elastically engaged to the coupling hook, to prevent the coupling plate from becoming unlocked.

\* \* \* \* \*